United States Patent Office 3,011,893
Patented Dec. 5, 1961

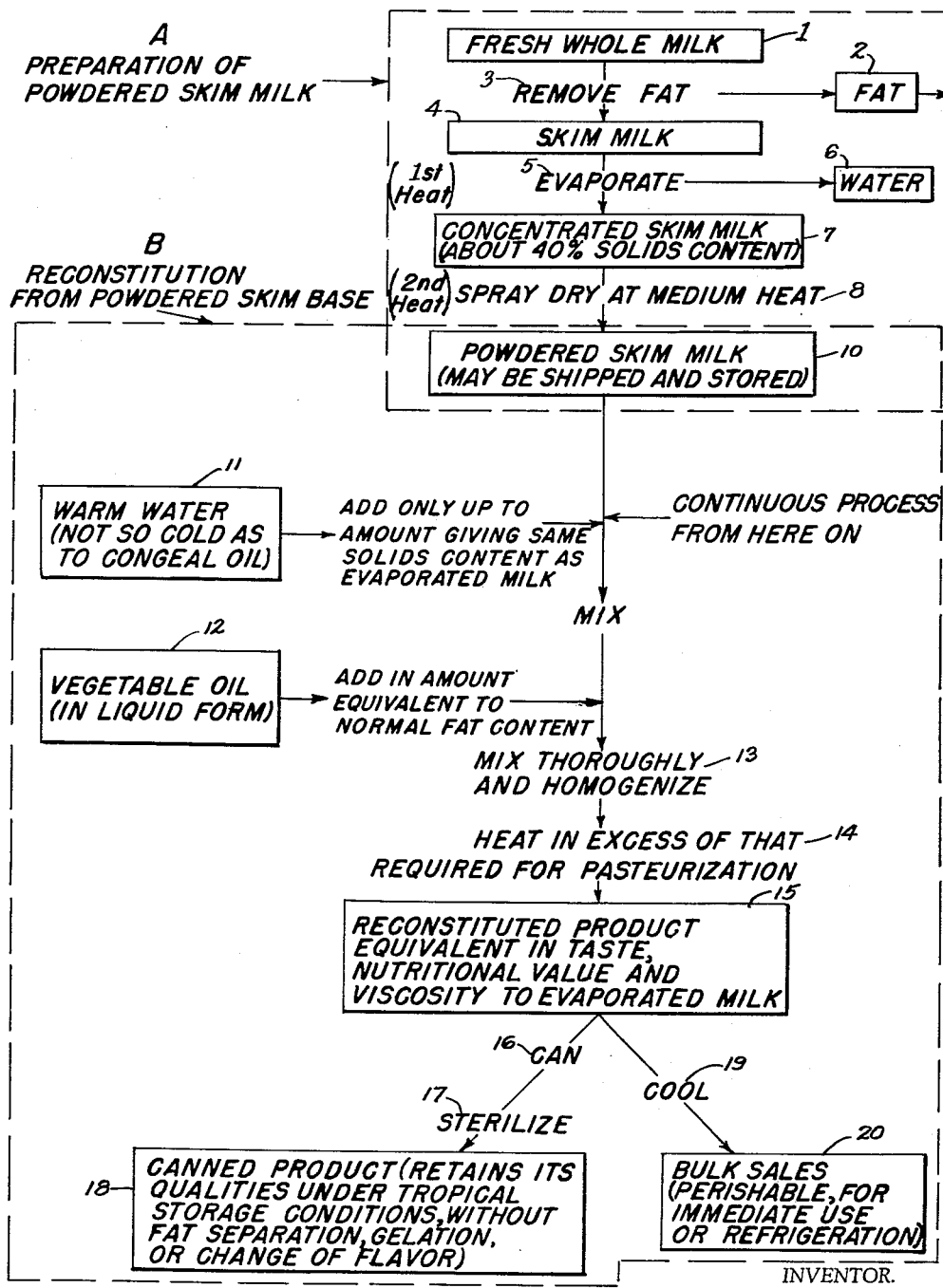

3,011,893
PROCESS FOR PRODUCING RECONSTITUTED
MILK PRODUCT LIKE EVAPORATED MILK
John A. Kneeland, Menlo Park, Calif., assignor to Pacific Vegetable Oil Corporation, San Francisco, Calif., a corporation of California
Filed July 19, 1957, Ser. No. 672,899
5 Claims. (Cl. 99—63)

This invention relates to the production of a novel concentrated milk product. More particularly, it relates to a method for directly combining powdered skim milk, vegetable oil, and water into a filled product which is the full equivalent of evaporated or condensed milk but which will keep better in hot climates. This application is a continuation-in-part of Serial No. 522,497, filed July 18, 1955, now abandoned.

Canned evaporated milk, though normally satisfactory in temperature climates, has always been a problem in the tropics—a zone where it is very important, due to the scarcity of fresh milk. Partly, the problems are due to the very fact that evaporated milk is whole milk (13% solids) with about half of its water content evaporated away, leaving about 26% solids content—18% non-fat and 8% fat. One major problem in the tropics has been that the fat has separated out into a condition where it can no longer be recombined by ordinary shaking or stirring. Another major problem has been that the viscosity of the evaporated milk has changed after canning, either during sterilization or, more commonly, during storage, until eventually it either became a solid gel or, due to fat separation, became a thin, watery liquid which, in turn, tended to curdle and gel. Often when a can of conventional evaporated milk is opened in the tropics, it is found to be completely solid and, even in those instances where it can subsequently be thinned out to a liquid state, it no longer has a satisfactory taste.

Another serious problem has been spoilage. Unless refrigerated, the canned milk turns and its butterfat gets rancid under tropical conditions, even though the milk is stored in sterilized cans.

Another difficulty with evaporated milk—and this applies to any liquid milk, including liquid skim milk, whether evaporated or not—has been the expense of transportation, due to the fact that most of the weight and bulk is in its water. Moreover, powdered milk is a relatively expensive product, so that its use is not economically desirable.

The present invention solves these problems by providing a filled milk product that is much better able to stand up under tropical storage conditions than is conventional evaporated milk, while having the same taste, the same nutritional values, the same viscosity, and the same appearance as freshly canned evaporated milk of high quality. The milk product produced by the method of this invention possesses a unique ability to resist fat separation after canning. Moreover, its viscosity remains constant under conditions where evaporated milk will gel.

The product resulting from this new method is a reconstituted milk derived from skim milk and preferably contains less expensive and more stable vegetable oil instead of butterfat, though the new process can employ butter fat if desired and still achieve results markedly superior to those obtainable under the prior art.

Reconstitution of powdered skim milk with added fat or oil into a filled milk equivalent to high-quality evaporated milk is no mean feat. For a long time it has been tried without success. Reconstitution of powdered skim milk must, of course, be differentiated from adding vegetable oil to fresh unevaporated liquid skim milk; liquid skim can be transported only short distances and under refrigeration. The difficulties with powdered skim arise from the fact that heat always has an effect on milk, and powdered skim has necessarily been heated at least twice—once when evaporating the fresh skim milk down to about 40% solids content and again when spray-drying the concentrated skim milk. This heating changes its properties so that it is no longer practical simply to add water and oil, mix, pasteurize, can, and sterilize; if that is done, the result will be a failure, because the product will gel. If fact, gelation of such reconstituted milk is much more rapid than with ordinary evaporated milk. That is why, in spite of the long time over which powdered skim milk has been available, no satisfactory product with a solids content equivalent to that of evaporated milk has heretofore been produced.

Yet reconstitution from powdered skim milk and vegetable oils is extremely desirable. The powdered solids keep well and are easily transported, while vegetable oil is available locally in the tropics and is relatively inexpensive. Also, reconstitution enables use of local labor and locally available equipment, labels, cans, etc. As a result, attempts at reconstitution have continued. One such attempt adds an excess amount of water to the powdered milk and oil and then evaporates the excess water. But such an expedient involves additional processing at additional expense. and it also involves the use of expensive equipment, skilled workmen, and continual laboratory supervision.

The present invention is based partly on the discovery of a very important but also very unusual and unexpected phenomenon: that effective reconstition can be achieved by applying heat in substantial excess to that necessary for pasteurization. This is quite surprising because, as has already been stated, the skim milk powder has necessarily been heated twice and to find that a third heat treatment cures the difficulties caused by the first two treatments did not, at first, seem logical or even possible. Yet experiments have proven that such is the case. This third heat treatment must take place as or very soon after the powder, oil, and water are mixed and very soon after or before the time of homogenization. When homogenization and heat treatment are done in this process, the fat will not separate out, even after long periods of storage. Moreover, there are no bad taste effects, and there is little or no tendency to gel.

As a result, the present invention provides a "filled evaporated" milk with greatly improved keeping qualities, greatly reduced or negligible gelling tendencies, and greatly reduced tendency toward fat separation. Yet the product has the same taste, solids content, nutrition and viscosity as high-quality, freshly canned evaporated milk, as produced in a temperate zone. This new product may be produced in the tropics as well as in temperate zones, without evaporators, etc., since the oil, water, and powder are mixed in the very amounts to be provided in the finished product.

Thus the objects of the invention include the provision of a novel filled milk product; a method for making, from skim milk, vegetable oil and water, a product fully equivalent to evaporated milk; a method for canning such a milk product in the tropics; a product that can be made, stored, and used in the tropics without gelation; and a way to provide the product at low expense.

Another object is to provide a method for making a reconstituted milk product by a process that is readily able to produce a standardized product without the delays due to laboratory work required in evaporated milk processes.

Another object is to make this filled milk product using only standard fluid milk processing equipment, such as heaters, homogenizers, pasteurizers, and sterilizers, without requiring expensive evaporators, hot wells, forewarmers, or laboratory equipment (all needed in producing evaporated milk) at the reconstitution plant.

Other objects and advantages of the invention will appear from the following detailed description of the best mode of practicing the invention, wherein the drawing is a flow sheet setting forth a preferred embodiment of the invention.

As the drawing indicates, there are two distinct parts of the process. One is the preparation A of the powdered skim milk and the other is the reconstitution B of the milk. Both are important.

Not every type of skim milk will give satisfactory results, and for best results the process must receive the proper attention from the point of origin of the milk at the cow. Fresh whole milk 1 is properly inspected and supervised to be certain that seasonal variations, variations in feed, type of cow, etc., does not adversely affect its quality. Then the fat 2 is removed at 3 by any suitable separation process. The remaining skim milk 4, while still quite fresh, is evaporated at 5, while subjecting it to heat to drive off most of the water 6, leaving, normally, concentrated skim milk 7 with about 40% solids. This is the first time that the milk is heated, and the heating is done according to well-known processes for preparing a high-quality powdered skim milk.

Next, the concentrated skim milk 7 is spray dried at 8, and this is the second time that the milk is heated. According to this invention, the spray drying 8 is done at medium heat, a term used in the art to mean that the temperature of the milk during spray drying lies between about 175° F. and 180° F. A discovery forming part of this invention is that spray drying at low heat (i.e., below about 170° F.) gives a skim milk with a pronounced tendency to gel during or shortly after reconstitution. Also, skim milk that is spray dried at high heat (i.e., above about 190° F.) tends to give a product with objectionable taste characteristics upon reconstitution. Therefore, while the reconstituted milk product of this invention gives improved results even with low-heat and high-heat powdered skim milk, especially in the 165°–195° range, the medium-heat product is by far the best and represents a strongly preferred embodiment of the invention.

The final result of the preparation process A, then, is a powdered skim milk 10 of high quality. The powder 10 may be packaged and stored. It may be shipped to a distant location and kept for any suitable length of time before being used in the reconstitution process B. It may be produced by an entirely different company, under the indicated specifications, than that practicing the reconstitution process B. Or both processes A and B may be done in the same plant, if desired. But an important advantage of this process is that the non-fat milk solids can be stored for a much longer time than can ordinary milk products. Also, the powder 10 occupies little space, an advantage in storage and shipment. Further, the powder 10 does not require refrigeration or other special treatment. It can be produced in a good dairy region in a well-equipped plant, and the powder 10 may then be sent overseas to less expensively equipped reconstitution plants near the area of actual distribution for the reconstituted product.

Once the reconstitution process B is begun, it is continuous and no large time interval should intervene between steps. Initially, the powdered skim milk 10 is combined with warm water 11 and vegetable oil 12 and mixed thoroughly. An important feature of the invention is that all the elements are added in the ratio in which they will appear in the final product. Thus, in a typical instance there will be 18% powdered skim milk 10, 8% vegetable oil 12, and 74% warm water 11. There is no initial paste to be further diluted, nor is the water added in excess and the excess later evaporated.

The vegetable oil 12 may be cocoanut oil, which is found in abundance in many tropical countries. It is bland, inexpensive, and nutritious, and it is liquid under most ambient temperature conditions in the tropics. Cottonseed oil may be preferred where it is less expensive. Other edible fats may be used, including butterfat, if desired, though it is expensive and not readily available in tropical countries. If a solid fat (such as cold cocoanut oil or hydrogenated cottonseed oil) is to be used, it should be heated enough to liquefy it, before adding it to the milk powder.

The water 11 is used warm in order to assure the maintenance of the liquid state of the oil 12. Thus, where cocoanut oil melts at about 72° F., the water temperature is preferably about 100° F. to 120° F., in order to make sure that no solid particles are suspended in the liquid oil. It does not matter greatly whether the water 11 is added to the powder 10 or vice versa, nor whether the water 11 and powder 10 are mixed before the oil 12 is added, or all three are added and mixed simultaneously, though the preliminary mixing of water 11 and powder 10 is preferable.

Two vital processes now follow: the mixture is homogenized at 13 and heat at 14; it does not matter whether the heat is applied before or after homogenization, so long as the process is continuous, with no substantial time lag between homogenization and heating. The term "substantially simultaneous" may be appropriate.

Homogenization 13 may be carried on by conventional equipment, preferably until the fractional size of the solids is about 1–2 microns or less. If this is carried on with the proper type of skim milk powder 10 (i.e., medium heat) and if the heat treatment is carried on as prescribed, there will be little or no tendency for the fat to separate out, even after long periods of storage.

A vitally important and unique part of this process is the heat treatment 14. This is not mere pasteurization, though it will accomplish pasteurization incidentally, and this is desirable. The heat applied must be in substantial excess over that required for pasteurization. Thus pasteurization is normally done at 140° F. But if only that much heat is applied the product will be unsatisfactory, as the following examples indicate.

*Example 1.—An unsatisfactory product, due to normal low-heat reconstitution*

900 grams of skim milk powder were added to 3700 grams of water and heated to 120° F. 400 grams of cocoanut oil were added. The mixture was then heated 140° F. for the normal pasteurization time of 30 minutes. Then the mixture was homogenized. The product was placed in cans, sealed, and then sterilized for 15 minutes at 240° F. This product developed a heavy gel on storage, which made it completely unacceptable as a filled "evaporated" milk.

*Example 2.—Another unsatisfactory product due to the same cause*

The process of Example 1 was repeated, except that the heat treatment comprised upheating the mixture to 165° F. over a 5-minute upheat time and then holding it for 5 minutes at 165° F. This time was sufficient for pasteurization, but again the product gelled on storage and was unacceptable.

*Example 3.—Also unsatisfactory*

The conditions of Examples 1 and 2 were repeated, except that the mixture was heated to 170° F. over a 5-minute upheat time and was then held at 170° F. for 2 minutes. Once more the product gelled on storage and was unacceptable.

As the preceding examples show, pasteurization is not enough; nor is heat treatment at low temperatures. There is a time-temperature relationship so that, even for temperatures high enough, enough time must elapse to act on the skim-milk base in some manner, the exact manner not yet being known, though apparently it has some effect on the lipo-protein structure.

The minimum heating appears to be about 4 minutes at 180° F. (after a 9-minute upheat time). About the same results can be obtained at 165° F. for 30 minutes and even momentary time at 240° F. will work, if sufficient upheat time is taken. It is necessary to apply more heat than would be needed for pasteurization and less than would caramelize the milk. 180° F. for about 5 minutes gives good results. Agitation during the heating is normally advisable. Example 4 shows how a satisfactory product may be made by proper heating.

*Example 4.—A satisfactory filled concentrated milk product*

Substantially the same conditions as in Examples 1–3 were repeated, except for the heat treatment. 900 grams of skim milk powder were added to 3700 grams of water and heated to 120° F. to assure holding the oil in the liquid state. 400 grams of cocoanut oil were added and the mixing continued. The mixture was then heated. Over a 9-minute period its temperature was raised from 160° F. to 180° F., and then it was left at 180° F. for 4 minutes, while under continuous agitation. This product was homogenized, placed in cans, sealed, and sterilized as before, at 240° F. for 15 minutes. No gel developed on storage. After 9 months at elevated temperatures (90° F. to 110° F.) the product still had excellent viscosity characteristics (3 to 11 Engler), taste, etc., and was an acceptable product.

*Example 5.—Another satisfactory product*

The procedure of Example 4 was followed, except that the product was heated from 160° F. to 190° F. for 15 minutes and was not held at 190° F. at all, but was immediately permitted to cool. It was then canned as before. This product was good. It had a viscosity of 11 Engler and a pH of 6.15. The color and flavor were all right.

*Example 6.—Another satisfactory product*

The procedure of Example 4 was followed, except that cept that the upheat time was 10 minutes, between 160° F. and 200° F., with no holding time. The product was fully satisfactory.

The minimum temperature of reaction appears to be 165° F. for 30 minutes. The temperature can be carried up to about 240° F. if heated carefully. The upper temperature limit is set by caramelization of the milk. When higher temperatures are employed, shorter holding and upheat times should be used. There is a time-temperature relation and not a mere temperature level to be considered.

Thus the result of the homogenization 13 and heating 14 is a reconstructed product 15 equivalent in taste, nutritional value, and viscosity to high-grade evaporated milk. This product 15 may be placed in cans at 16 and the cans sealed, and submitted to the standard sterilization 17 at 240° F. for 15 minutes. As Examples 1–3 indicated, this heating in the can after sealing will not alone produce the desired effect while, as Examples 4–6 show, it does not counteract the effect. The final result, where canning is done, is a canned product 18 equivalent to high-quality evaporated milk, except that it retains its qualities under storage conditions obtaining in the tropics, without fat separation, gelation, or change in flavor or viscosity.

An alternative procedure is to cool the reconstituted product 15 at 19 and sell it in bulk 20. This product 20 is perishable and should be used immediately or kept for a short period under refrigeration. But it is very good for baking, etc., and is preferred by some users of large quantities because it is, necessarily, a little less expensive.

*Example 7.—Bulk product*

The procedure of Example 4 was followed, except that after heating 14 and homogenization 13 the product 15 was placed in five-gallon cans and placed under refrigeration. Its flavor, viscosity, and fat-separative characteristics were satisfactory after several months refrigerated storage. At ambient temperature its keeping qualities were superior to those of fresh milk.

In addition to the main ingredients 10, 11, and 12, chocolate or other flavoring, emulsifiers, stabilizers, preservatives, etc. may be added.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A process for producing a reconstituted milk product from powdered skim milk of the medium-heat type, comprising: thoroughly mixing approximately 18 parts by weight of said powdered skim milk, approximately 8 parts by weight of liquefied vegetable oil, and approximately 74 parts by weight of warm water; homogenizing the resultant mixture; heating the mixture while agitating it, to about 180° F.–185° F. for about 5 minutes; and cooling the mixture.

2. The process of making a liquid, canned, sterilized, concentrated milk product having the characteristics of standard evaporated milk, comprising mixing water, vegetable oil, and non-fat milk solids of the medium heat type in proportions corresponding to evaporated milk, homogenizing and heating the mixture to a temperature of from 165° F. to 240° F. and holding the mixture at the temperature for from about thirty minutes to a few seconds, the holding time being approximately inversely proportional to the temperature to which the product is heated, cooling the product to about 140° F., and then canning and sterilizing the product.

3. The process of making a concentrated milk product, comprising mixing water, vegetable oil, and non-fat milk solids of the medium-heat type in proportions corresponding to those in standard evaporated milk, homogenized and heating the mixture to a temperature of from 165° F. to 240° F., the mixture being at a temperature above 165° F. for between 30 minutes and a few seconds, the holding time being approximately inversely proportional to the temperature to which the product is heated.

4. The method of claim 3, wherein said homogenizing and heating are done substantially simultaneously.

5. A process for making a reconstituted milk product from powdered skim milk of the medium-heat type, comprising mixing the powdered skim milk with a liquefied fat and water in a ratio corresponding to that of the non-fat solids, fat-solids, and water in standard evaporated milk, and homogenizing and heating the mixture to a temperature of from 165° F. to 240° F., the mixture being at a temperature above 165° F. for between 30 minutes and a few seconds, the holding time being approximately inversely proportional to the temperature to which the product is heated.

References Cited in the file of this patent

UNITED STATES PATENTS

| | | |
|---|---|---|
| 1,190,369 | Beckman et al. | July 11, 1916 |
| 1,432,632 | Stevens et al. | Oct. 17, 1922 |
| 1,941,261 | Hellerud | Dec. 26, 1933 |
| 2,075,358 | Reeves | Mar. 30, 1937 |
| 2,335,275 | Hauser et al. | Nov. 20, 1943 |
| 2,553,783 | Park | May 22, 1951 |

FOREIGN PATENTS

| | | |
|---|---|---|
| 359,059 | Great Britain | Oct. 22, 1931 |